United States Patent [19]
Gibson

[11] 3,962,093
[45] June 8, 1976

[54] APPARATUS FOR REMOVING CONTAMINANTS FROM THE SURFACE OF A FLUID

[75] Inventor: Roland Richard Gibson, London, England

[73] Assignee: The Glacier Metal Company Limited, Alperton, England

[22] Filed: Mar. 5, 1975

[21] Appl. No.: 555,349

Related U.S. Application Data
[63] Continuation of Ser. No. 396,869, Sept. 12, 1973, abandoned.

[30] Foreign Application Priority Data
Sept. 13, 1972 United Kingdom............... 42467/72

[52] U.S. Cl............................. 210/242 S; 210/167; 210/171; 210/DIG. 25
[51] Int. Cl.²........................................ E02B 15/04
[58] Field of Search............ 210/83, 122, 169, 171, 210/242, 538, 540, DIG. 21, 167

[56] References Cited
UNITED STATES PATENTS

| | | | |
|---|---|---|---|
| 1,450,545 | 4/1923 | Hans.................................. | 210/122 |
| 2,989,185 | 6/1961 | Lombardi...................... | 210/169 X |
| 3,756,578 | 9/1973 | McGurk.......................... | 210/242 X |
| 3,759,390 | 9/1973 | McCombie........................ | 210/242 |
| 3,789,586 | 2/1974 | Arnold et al................. | 210/DIG. 21 |
| 3,876,540 | 4/1975 | Falxa.............................. | 210/242 X |

*Primary Examiner*—Charles N. Hart
*Assistant Examiner*—Robert G. Mukai
*Attorney, Agent, or Firm*—Pierce, Scheffler & Parker

[57] ABSTRACT

Oil and other contaminants are removed from a surface of liquid e.g. in a settling tank of an internal combustion engine by a system incorporating a pump for circulating liquid through an annular nozzle disposed above the surface by floats. The nozzle directs a stream of liquid on to the surface and this stream carries contaminant below the surface where it is received by a nozzle communicating with a source of suction.

1 Claim, 3 Drawing Figures

APPARATUS FOR REMOVING CONTAMINANTS FROM THE SURFACE OF A FLUID

This is a continuation of application Ser. No. 396,869 filed Sept. 12, 1973, and now abandond.

This invention relates to liquid-surface-layer extraction devices; systems incorporating such devices, and methods of extracting surface layers from liquids. The invention is of particular application to the problem of removing oil contamination lying on the surface of water which is used for engine cooling purposes.

It is to be stressed however that the invention has broader application to the extraction of surface layers of any kind for example liquid or solid floating contamination whether on settling tanks for engines or any other industrial application. It also applies to extraction of surface contaminant such as oil on the open sea.

Many proposals have been made for removing, by skimming, oil layers floating on effluent settling tanks. These generally require critically located float arrangements to ensure that suction openings are close to the surface to enable extraction of a thin floating film of oil without also extracting too high a percentage of uncontaminated water and also avoiding as far as possible sucking air from above the surface of the contaminant. This is found to be difficult in water borne apparatus for example in a ship because of the natural wave formation caused by the motion of the ship. Such problems are also encountered in static installations owing to disturbance of the surface level.

Complicated float structures have been proposed to try to overcome these problems but this introduces further problems in that these structures tend to inhibit the free motion of floating contaminant material towards the separation device.

According to one aspect of the present invention a liquid-surface-layer extraction device is characterized by a nozzle wihich is adapted to direct a stream of fluid downwards into the surface of a liquid, and an orifice disposed directly below the nozzle and which is adapted to receive a surface layer entrained by the fluid stream.

The nozzle and orifice are preferably maintained in fixed spaced apart relationship and are mounted on a float assembly which maintains the nozzle at a predetermined height above the surface of a liquid.

In a particularly convenient arrangement both the nozzle and the orifice have an annular configuration and are for example mounted concentrically on a tube extending upwardly to supply fluid to the nozzle.

The invention also concerns a liquid surface contamination separation system which incorporates a device of the type referred to above and which incorporates a source of fluid pressure arranged to supply fluid to the nozzle.

Where the system forms part of the cooling system of an internal combustion engine it may be installed in a settling tank forming part of the cooling system of the engine and in this case water preferably conveyed from a region adjacent the lower part of the tank to the nozzle for example by means of a by-pass connection downstream of a pump in the cooling system. In this way the liquid which is received by the nozzle, and is directed downwards to cause entrainment of contamination on the surface, originates from a relatively clean region of the contents of the tank.

The invention may be carried into practice in various ways, but one particular engine cooling system embodying the invention will now be described by way of example, with reference to the accompanying drawings, of which:

Figure 1:
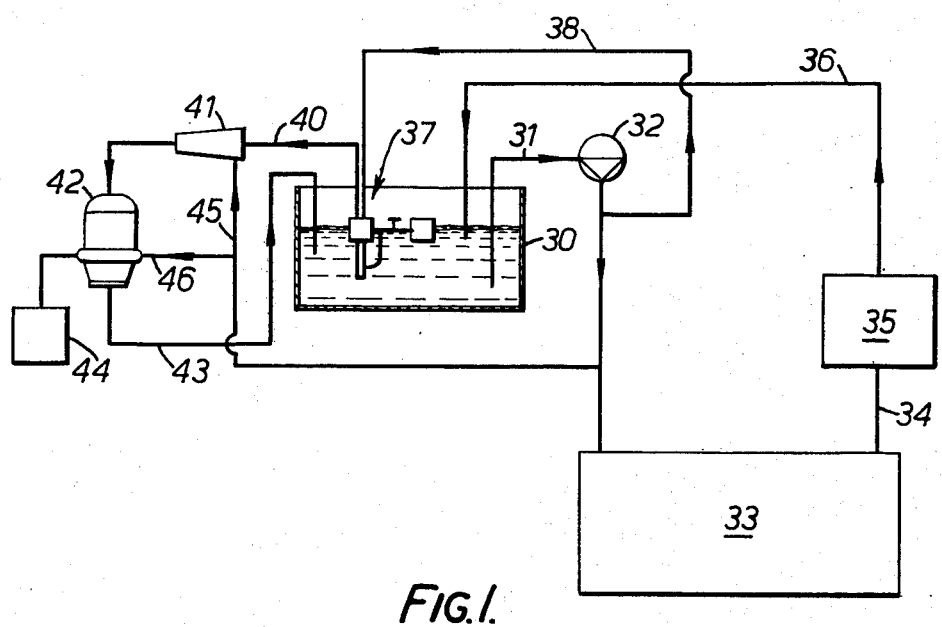
FIG. 1 is a block diagram of the engine cooling system.

The engine cooling system is arranged to circulate water from an expansion tank 30, through a conduit 31 and a pump 32 to an internal-combustion engine 33. The water then passes through a further conduit 34 to an air-cooled radiator 35, and from there back to the expansion tank 30 through a return conduit 36. Thus the engine is cooled by the water, and the water is itself cooled in the radiator 35.

The expansion tank 30 contains a floating skimmer, indicated generally at 37, whose construction will be described in detail later. The skimmer 37 is supplied through a by-pass conduit 38 with water taken from the delivery of the pump 32. The skimmer operates to deliver to a delivery conduit 40 the water supplied to it through the conduit 38, together with a surface layer of the water in the tank 30. Thus if there are any contaminants such as oil floating on the water in the tank 30, they will be removed through the conduit 40 with the surface layer of the water.

The conduit 40 leads to an ejector 41 which assists the withdrawal of liquid through the conduit, and thence to a centrifugal oil separator 42. The separator 42 returns water which has been freed of oil to the expansion tank 30 through a conduit 43, and delivers the separated oil to a tank 44 for re-use in the engine 33.

The ejector 41 and the separator 42 are operated by water taken from the delivery of the pump 32 through by-pass conduits 45 and 46.

Figure 2:
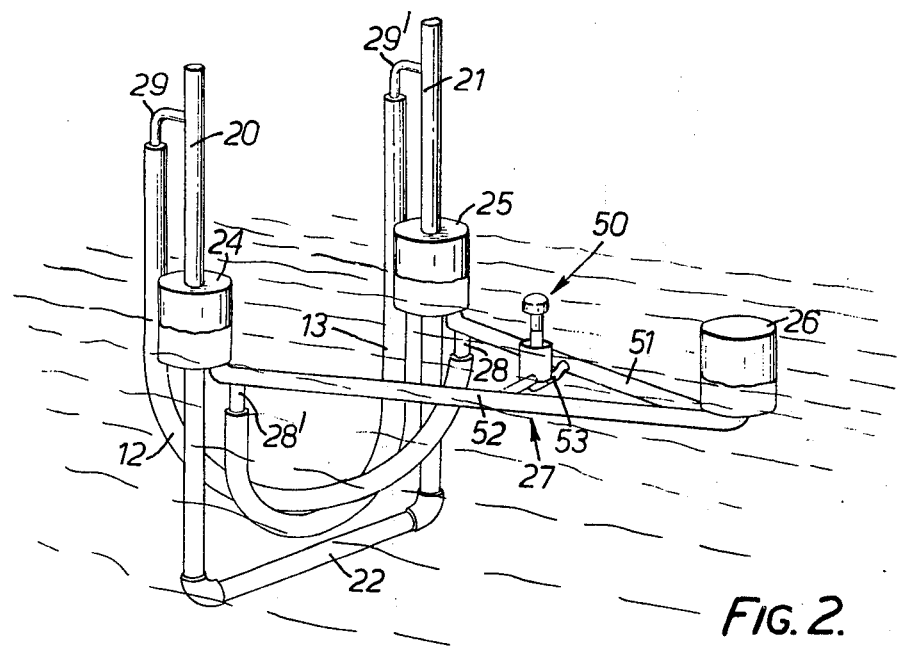
FIG. 2 is a perspective view of a floating skimmer forming part of the cooling system.

FIG. 2 shows how the skimmer can move vertically as the water level in the tank 30 changes, so that it is always in the same position relative to the water surface. Two fixed vertical tubes 20, 21 project downwards into the tank 30, and are braced at their lower ends by a bar 22. Each tube 20, 21 passes through a central bore in a plastics float 24, 25 respectively, so that the floats are guided to move only in a vertical direction. The floats 24, 25 each support one end of the legs 52, 51 respectively of a tubular A-shaped frame 27, while the third corner, at the apex of the A, is supported by another plastics float 26.

The conduit 38, shown in the circuit of FIG. 1, is connected to the upper end of the tube 20. The tube 20 has a branch pipe 29 near its upper end, and this is connected by a flexible hose 12 to a branch pipe 28 connected to the leg 51 of the frame 27, near the float 25. The crossbar 53 of the frame 27 carries at its centre a device 50 which performs the actual skimming operation, in a manner which will be described later. Thus the water supplied through the by-pass conduit 38 reaches the device 50 through the tube 20, the branch pipe 29, the flexible hose 12, the branch pipe 28, the leg 51 of the frame 27, and part of the crossbar 53. In a similar way, the contaminated water leaving the device 50 reaches the ejector 41 through the other part of the crossbar 53, the leg 52 of the frame 27, a branch pipe 28', a flexible hose 13, a branch pipe 29', the tube 21 and the conduit 40 (FIG. 1). The tubes 20, 21 are, of course, blocked below the level of the branch pipes 29, 29'; the legs of the frame 27 are also blocked at their ends adjacent the floats 24 and 25.

Figure 3:
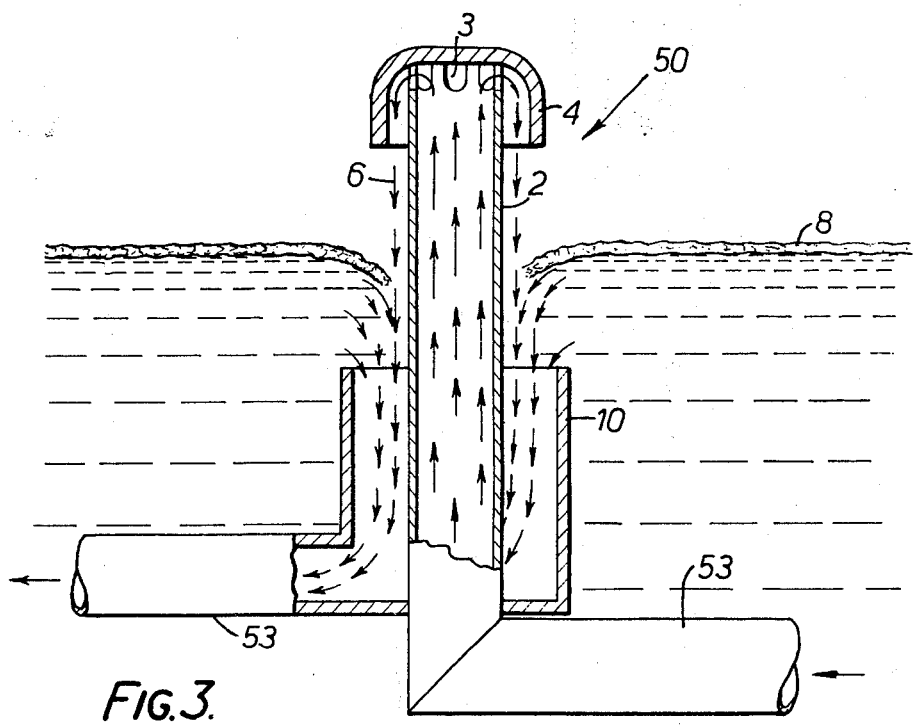
FIG. 3 is a detailed vertical section through part of the skimmer.

As shown in FIG. 3, the device 50 includes a vertical pipe 2, the bottom end of which is in communication through part of the crossbar 53 with the leg 51 of the frame 27. A deflector cap 4 is attached to the top of the pipe 2, and is arranged to deflect the upward flow of water supplied through the conduit 38 through apertures 3 in the wall of the pipe 2 and down the outside of the pipe 2 in an annular jet, as indicated by the arrows 6. The device 50 is so positioned in relation to the floats 24, 25, 26 that the jet emerges from the deflector cap a short distance (typically 2 or 3 inches) above the water surface.

As the annular jet enters the liquid in the tank, it entrains the oil or other contaminant floating on the water surface, as shown at 8, as well as a certain amount of water. The jet and the entrained liquid are received by an annular suction nozzle 10 which forms part of the separating device, and is positioned about ¼ inch below the water surface. Since the downward flow has three concentric zones (the main annular jet, the flow of entrained oil outside this, and the flow of entrained water outside this), the diameter of the suction nozzle can be so chosen that under ideal conditions it will accept the main annular jet and the entrained oil and reject the entrained water, which will pass down the outside of the nozzle.

The suction nozzle 10 communicates through part of the crossbar 53 with the leg 52 of the frame, and thus with the conduit 40. The contaminated water received by the nozzle 10 is therefore supplied to the separator 42, where the contaminants are removed before the water is returned to the expansion tank 30.

It will be understood that, although the pipe 2 and the suction nozzle 10 have been shown as circular in cross-section, other shapes could be used. For example, a generally circular shape with corrugated walls could be used for one or both of these components. If such a shape were used for the pipe 2, the peripheral dimension of the annular jet would be increased, allowing more effective entrainment of the contaminant, without increasing the size of the device. The use of such a shape for the suction nozzle 10 may be advantageous in limiting the amount of entrained water entering the nozzle.

It is also possible to make the cross-sectional area of the suction nozzle 10 adjustable. This allows the nozzle to be adjusted for optimum performance in a particular installation.

The nozzle could also be provided with an inner cylindrical wall whose diameter is so chosen that, at least under ideal conditions, the entrained contaminants pass outside it and enter the nozzle, while the annular jet of water passes inside it and returns to the tank through slots at the bottom of the device.

Although the suction nozzle 10 has been described as being positioned about ¼ inch below the water surface, it will be understood that this dimension is not critical; any dimension is suitable provided the annular jet is still well-defined when it reaches the suction nozzle 10.

What we claim as our invention and desire to secure by Letters Patent is:

1. A liquid-surface-layer extraction device including a floatable assembly having first, second and third spaced floats, the first float being connected to each of the second and third floats by interconnecting inlet and outlet tubes respectively, the inlet tube having fluid flow communication with an upwardly extending supply tube mounted on one of the second and third floats and the discharge tube having fluid flow communication with an upwardly extending discharge tube mounted on the other of the second and third floats, the interconnecting tubes supporting between them a nozzle which is adapted to direct a stream of fluid downwardly into the surface of a body of liquid, an orifice being disposed directly below said nozzle and being adapted to receive a layer of the liquid entrained by said fluid stream, the orifice being connected to the outlet tube, the nozzle having a supply duct which extends upwardly through said orifice and the lower end of the supply duct being connected to the interconnecting inlet tube.

* * * * *